Dec. 9, 1952     H. G. JENSEN     2,621,241
SELECTOR FOR AUTOMATIC PHONOGRAPHS
Filed Sept. 23, 1949     4 Sheets-Sheet 1

INVENTOR
Herman G. Jensen
BY John F. Eakins
ATTORNEY

Dec. 9, 1952 H. G. JENSEN 2,621,241
SELECTOR FOR AUTOMATIC PHONOGRAPHS
Filed Sept. 23. 1949 4 Sheets—Sheet 2

INVENTOR
Herman G. Jensen
BY John F. Eakins
ATTORNEY

Dec. 9, 1952        H. G. JENSEN        2,621,241
SELECTOR FOR AUTOMATIC PHONOGRAPHS
Filed Sept. 23, 1949        4 Sheets—Sheet 3

INVENTOR
Herman G. Jensen
BY
John F. Eakins
ATTORNEY

Patented Dec. 9, 1952

2,621,241

UNITED STATES PATENT OFFICE 2,621,241

SELECTOR FOR AUTOMATIC PHONOGRAPHS

Herman G. Jensen, Chicago, Ill., assignor to J. P. Seeburg Corporation, Chicago, Ill., a corporation of Illinois Application September 23, 1949, Serial No. 117,389

12 Claims. (Cl. 177—353)

This invention relates to selectors for automatic phonographs and has for its principal object the provision of such a selector whereby any of a large number of selections may be selected by suitable action of a relatively small number of parts.

In phonograph selectors including a relatively small number of electromagnetic devices corresponding individually to available selections, the problem of energizing any electromagnetic device is comparatively simple, for example, a separate button may be provided for each selection and it may merely close a switch in the circuit of the corresponding electromagnetic device. When, however, the phonograph provides a large number of selections, for example 100 or more, such a system becomes very costly and very difficult to assemble.

In accordance with the present invention, I provide a plurality of sets of buttons and arrange for selections to be made by actuating a button of each set. Thus, with two sets of buttons of ten each, I can make 100 selections. I divide the electromagnetic devices into a plurality of groups and I connect a common conductor to a single electromagnetic device of each group. Thus, if I have ten groups, I require ten such common conductors. If, as in an embodiment of the device illustrated herein I use five groups, then I require 20 common conductors. I arrange an electromagnetic device for each group and when I energize one of the group electromagnetic devices, its armature makes contact with the unconnected other sides of the selection electromagnetic devices. Actuating a button of each set, energizes one of the group electromagnetic devices and connects only one of the common conductors into an energized selecting circuit with the result that the corresponding selector magnetic device alone is energized, that one being the single selector electromagnetic device connected to that particular common conductor whose selecting circuit is completed by its group electromagnetic device. The other selector electromagnetic devices connected to that common conductor are uneffected because their group electromagnetic devices are not energized and no current may pass therethrough.

The energization of the group electromagnetic devices is primarily the function of the buttons of one set, while the connection of one of the common conductors into the selecting circuit is primarily the function of the other set of buttons. In the case that I employ ten groups and ten common conductors, the functions of the two sets of buttons can be completely independent. For reasons of economy, I prefer to employ five groups of 20 common conductors. With two sets of buttons of ten each, each of the group electromagnetic devices may be energized by actuation of either of two buttons of one set. Each button of the other set provides the possibility of connection to two of the common conductors. The common conductor which is actually brought into the selector circuit is determined by which button of the first set is actuated. For the sake of clarification, it may be mentioned that the first set of buttons carries letters and the second set of buttons bears numbers. Thus, if button 5 is actuated, it provides the possibility of connection of common conductor 5 or common conductor 15 in the selecting circuit. If button A, C or E is actuated, common conductor 5 is thus included. If the alternate buttons B, D, F, etc. are actuated, common conductor 15 is included in the selecting circuit.

To make selection, it is necessary to actuate one button of each set, that is, a numbers button and a letters button. No advantage can be attained by pressing more than one button of each set. The switches carried by the buttons are arranged in series circuits which are broken at the button actuated and are connected to other circuits. Thus, if button A and button C are actuated, only the group electromagnetic device corresponding to A is energized. The actuation of the button A prevents the supply of voltage to the group electromagnetic device corresponding to C and so forth.

The invention will more readily be understood from the following description of a preferred embodiment thereof, taken in conjunction with the accompanying drawings, in which.

This selector is particularly well adapted for the phonograph described and claimed in copending application Serial No. 132,147 filed by me December 7, 1949. This phonograph comprises 100 electromagnets 51, each individual to a recording and individual armatures 52. The armatures are grounded and when one or more of them is displaced, it or they engage a conductor 53 and complete a circuit to put the phonograph into operation. The phonograph cooperates with the displaced armature so that the corresponding record is selected and played and the armature is mechanically returned to its normal position. When all displaced armatures have been thus returned and the last record selected has been played, the phonograph goes out of operation. A selection is made by pressing one button of each of two series of buttons 54 and 55. There are ten buttons in each series to enable 100 different selections to be made. For ease in selection, one series of buttons bears letters and the other series bears numbers. Thus, it can be seen that selections A1, B5, C9, G4, H10, K6, etc. can be made. Letter I is omitted to avoid confusion with the number 1. Each button is mounted on a bar 97 and carries contacts, shown in block form in Fig. 1, which cooperate with contacts shown in the form of arrow-heads in this figure. Thus, each of the number bars carries a contact 56 and a contact 57. Each number button carries a contact 58 and a contact 59. Normally, the contacts 56 are connected in series by stationary contacts 60 and one end contact 56 is connected through a resistor 61 to a normally open switch 62. When one of the letter buttons A, C, E, G or J is pushed in, the series circuit is interrupted at that button and is connected to a line 63 which is connected to a similar series circuit constituted by the numbers contacts 59. When one of the letter buttons B, D, F, H or K is pushed in, the series circuit of the contacts 56 is again broken at the actuated letters button and is connected to a line 64 which is connected to a similar series circuit constituted by the numbers contacts 58. The contacts 57, likewise, are normally connected in series and to a switch 65. When one of the letters buttons is pushed in, this series circuit is broken at the actuated button and is connected to one of five lines, which, in turn, are connected individually to double electromagnets 66, 67, 68, 69 and 70. When numbers button A or B is pushed in, the switch 65 is connected to the double electromagnet 66. When button C or D is pushed in, the switch 65 is connected to electromagnet 67. Button E or F makes connection to the electromagnet 68. Button G or H makes connection to the electromagnet 69 and button J or K makes connection from the switch 65 to the double electromagnet 70. When one of the numbers buttons is pushed in, the series circuit provided by the contacts 58 or 59, respectively, are broken at that button and these circuits are connected to two conductors; 20 conductors in all. These conductors are numbered from 1 to 20. Thus, actuation of button number 1 connects the series circuit of the contacts 58 to conductor 11 and the series circuit of contacts 59 to conductor 1. Number button 5 connects the first series circuit to conductor 15 and the second series circuit to conductor 5. Button number 10 connects the first series circuit to conductor 20 and the second series circuit to conductor 10.

Figure 1:
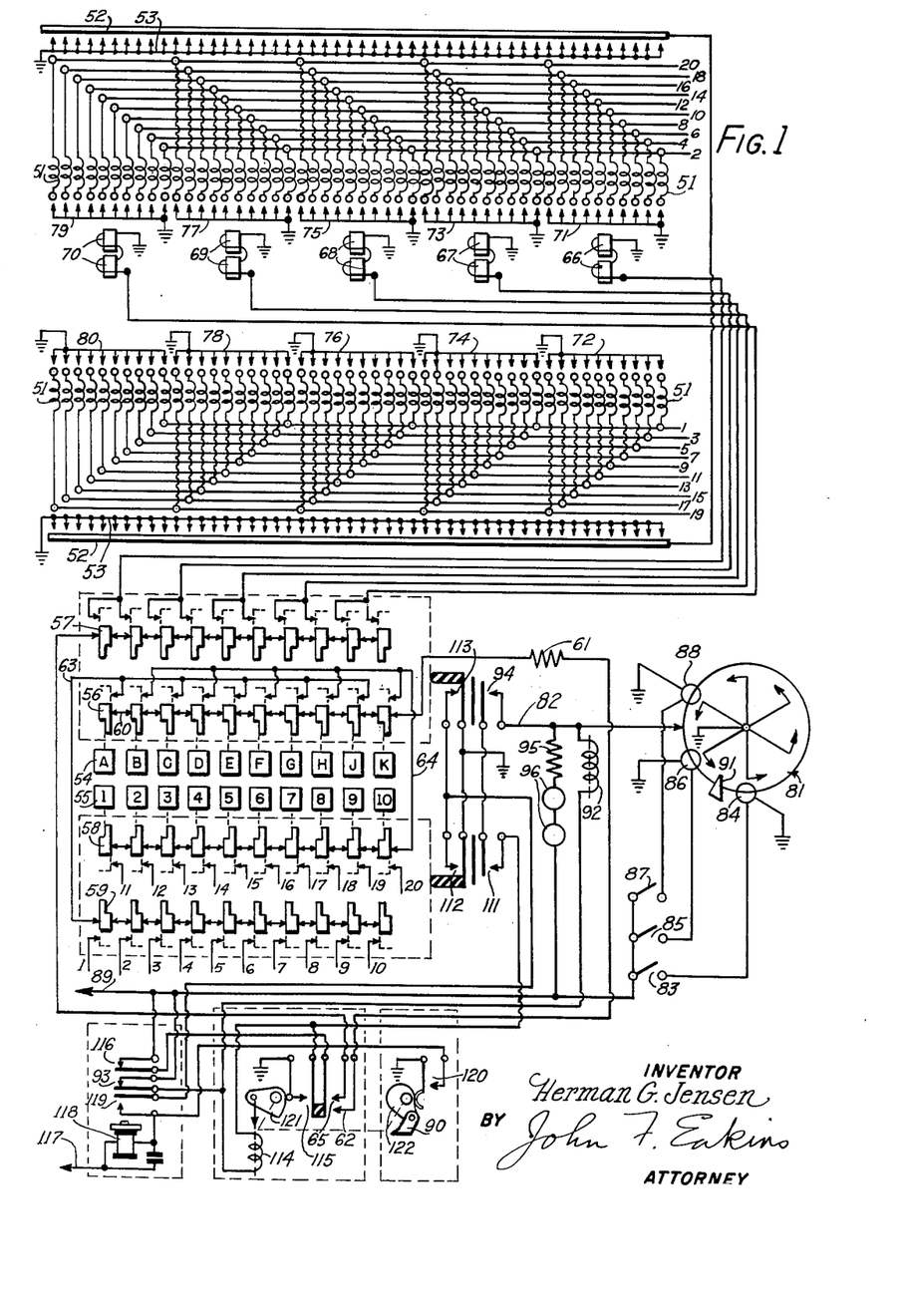
Figure 1 is a wiring diagram of my improved selector.

The lower row of electromagnets 51 in Fig. 1 corresponds reading from right to left, to selections A1, A3, A5, A7, A9, B1, B3, B7, B9, C1, C3 . . . and so forth, up to K9. Conductor 1 is connected to electromagnets A1, C1, E1, G1 and J1. Conductor 3 is connected to electromagnets A3, C3, E3, G3 and J3. Conductor number 11 is connected to B1, D1, F1, H1 and K1. Conductor 13 is connected to electromagnets B3, D3, F3, H3 and K3, and so forth.

The even numbered conductors 2 to 20 are connected in similar and opposite fashion to the upper row of electromagnets 51 in Fig. 1. Thus, conductor 2 is connected to electromagnets A2, C2, E2, G2 and J2. Conductor 4 is connected to electromagnets A4, C4, E4, G4 and J4. Conductor 12 is connected to B2, D2, F2, H2 and K2. The upper row of electromagnets 51 in Fig. 1 reads, again from right to left, A2, A4, A6, A8, A10, B2, B4, B6, B8, B10, C2, C4 . . . C10, D2, D4, etc., up to K10. These two series of electromagnets are arranged opposite each other.

Each row of electromagnets 51 in Fig. 1 is divided into five groups. When electromagnet 66 is energized, its armatures 71 and 72, which are grounded, ground the other terminals of the first two groups. That is, the upper group which comprises A2, A4 . . . B8, B10 are grounded by the armature 71 when the electromagnet 66 is energized and the corresponding lower group which comprises electromagnets A1, A3 . . . B7, B9, are grounded by armature 72. Likewise, the armatures 73 and 74 ground two groups C2, C4 . . . D6, D8, D10 and C1, C3 . . . D7, D9 when the electromagnet 67 is energized. Likewise, the armatures 75 and 76, when electromagnet 68 is energized, ground the two groups of electromagnets E2, E4 . . . F8, F10 and E1, E3 . . . F7, F9. When electromagnet 69 is energized, its two armatures 77 and 78 ground the two groups of electromagnets G2, G4 . . . H8, H10, and G1, G3 . . . H7, H9. When the electromagnet 70 is energized, its two armatures 79 and 80 ground the two groups of electromagnets J2, J4 . . . K8, K10 and J1, J3 . . . K7, K9.

As will hereinafter appear, only one of the electromagnets 66 to 70 is energized at any one time and only one of the conductors 1 to 20 is connected to a source of energy at that time so that only one of the electromagnets 51 is energized at one time.

Figure 5:
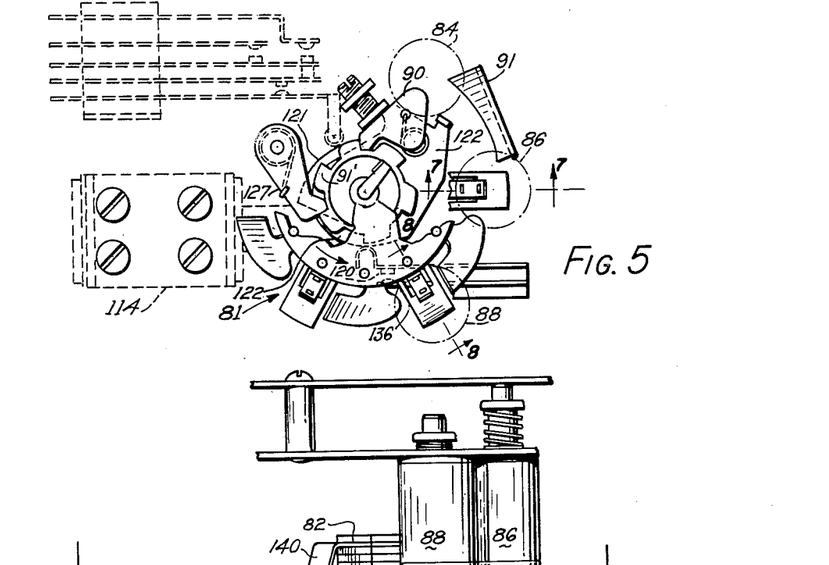
Fig. 5 is a sectional plan view of the credit assembly, the section being taken on the line 5—5 of Fig. 6.

The selector is coin controlled. The coin control illustrated is that described and claimed in co-pending application Serial No. 736,446, filed March 22, 1947, by Henry M. Merrill. This coin control comprises a rotary assembly 81 including six switches. The reason that six switches are employed is that the machine for which the present embodiment of the invention is intended, operates on the basis of one play for a nickel, two for a dime and six for a quarter. When anyone of the switches is closed, the line 82 is grounded, rendering the selector operative. A quarter momentarily closes a switch 83 and energizes a solenoid 84 to close the switch of the array 81 at that position. A nickel closes the switch 85 and energizes the solenoid 86 to close the switch of the array 81 at that position. A dime closes a switch 87 and energizes a solenoid 88 to close the switch of the array 81 at that position. The switches 83, 85 and 87 are connected to a power line 89. The array 81 is rotated in counterclockwise direction, as viewed in Fig. 5, one switch spacing by a dog 90 at the end of each selecting operation. This brings the closed switch of the array 81 step by step towards a stationary element 91 which opens the switch. It will readily be seen that the switch closed by the nickel solenoid 86 is opened at the end of the first selection. The switch closed by the solenoid 88 permits two selecting operations and the switch closed by the solenoid 84 becomes opened during the sixth selecting operation. The dog 90 cooperates with a ratchet 91' which is rigidly secured to the array of switches 81. When one of the switches of the array 81 is closed, the line 82 is grounded, energizing a solenoid 92 which is connected to the power line 89 through the normally closed switch 93. The line 82 is connected to one side of a switch 94 and through a resistor 95 to lamps 96 to the power line 89. The illumination of these lamps indicates that there is credit on the selector.

Figure 2:
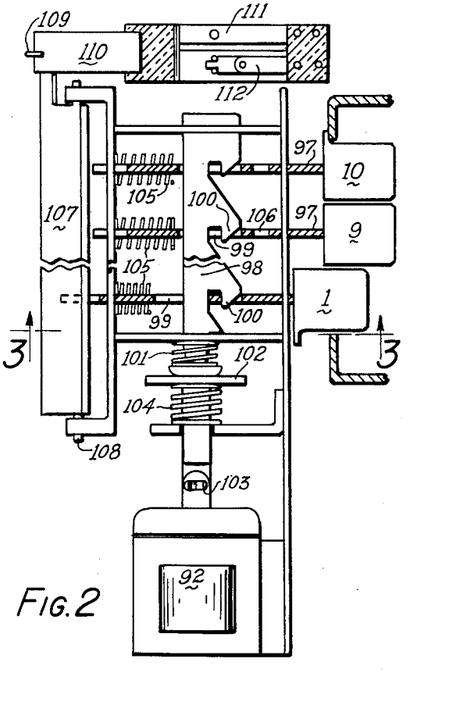
Fig. 2 is a fragmentary sectional view through one of the sets of buttons and illustrating cooperating elements.
Figure 3:
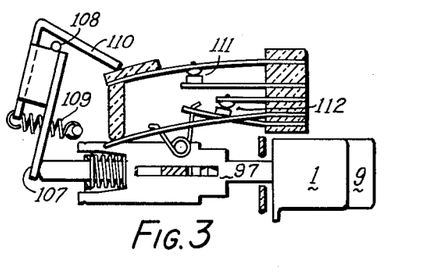
Fig. 3 is a transverse sectional detail taken on the line 3—3 of Fig. 2.

The relation of the solenoid 92 to the latch bars 98 is shown in Fig. 2. A bar 98 extends through the bars 97 of each row of buttons normally extending through large openings 99 in the bars 97. These openings are sufficiently large to accommodate the whole width of the bar 98 including detent formations 100. Each bar 98 is biassed downwardly as viewed in Fig. 2 by a relatively weak spring 101. The lower end of each bar bears against a plate 102 which is connected to the armature 103 of the solenoid 92. A strong spring 104 biasses the armature 103 upwardly and forces the locking bars 98 upwardly against the relatively weak pressure exerted by the spring 101. Consequently, when the solenoid 92 is deenergized, the bars 98 are moved upwardly from their position in Fig. 2 and if any button is pressed, it is immediately pushed out by its spring 105. The solenoid 92 is energized when the line 82 is grounded by the credit mechanism and, in that event, the bars 98 are in the position shown in Fig. 2, having their detents 100 aligned with the bars 97. Consequently, when a button is pushed in, the bar 98 is moved upwardly by the bar 97 engaging a cam shaped detent 100 and when the button is pushed in completely, the detent 100 enters an opening 106, holding the bar 97 in. It is to be noted that if another button of the same row is pushed, the bar 98 is again moved upwardly releasing the first button so that only the last actuated button is held in. The bars 97 of the numbers buttons which are shown in Fig. 2 are arranged to engage a plate 107 which is pivotally mounted at 108 and is biassed towards the bars 97 by a spring 109, as best shown in Fig. 3. When a button is pushed the whole way in, an extension 110 closes two switches 111 and 112. A similar structure on the letters buttons similarly closes the switch 94 and the switch 113. The switch 111 is connected in series with switch 94 and to a cancel relay 114 and switch 115. The other side of the switch 115 is grounded. The other side of the relay 114 is connected through a switch 93 to the power line 89. The common side of the switches 62 and 65 is connected through a normally closed switch 116 to the power line 89. A source of direct current 117 is connected to a relay 118. The other side of the relay is connected through a normally open switch 119 to the two switches 112 and 113, the other sides of which are grounded. The other side of the relay 118 is connected to one side of the normally open switch 120, the other side of which is grounded.

The armature of the relay 114 is connected to a cam 121 which effects closing of the switches 115, 65 and 62 and it is also connected to the cam 122 which carries the dog 90 and also effects closing of the switch 120.

Figures 6, 7:
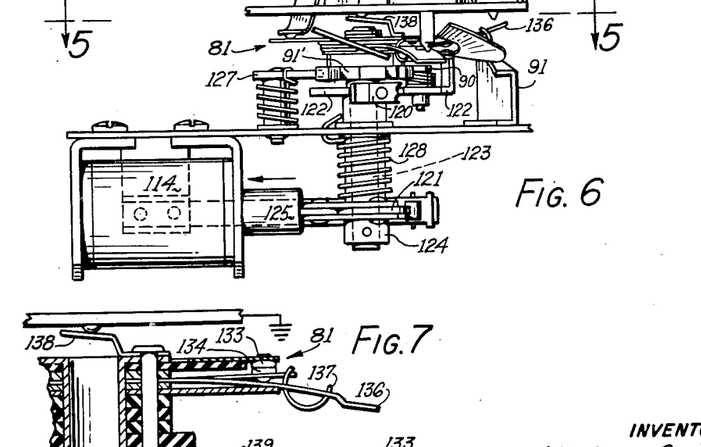
Fig. 6 is an elevational view of the credit assembly.
Fig. 7 is a sectional detail taken on the line 7—7 of Fig. 5.
Figure 8:
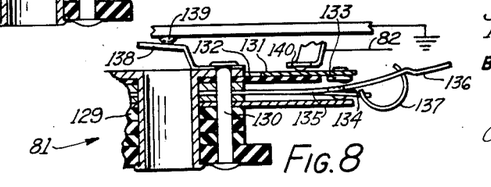
Fig. 8 is a similar view taken on the line 8—8 of Fig. 5.

The cams 121 and 122 are rigidly mounted on a shaft 123, which is rotatably mounted in a frame 124, best shown in Fig. 6. The relay 114 is carried by the frame 124 and its armature 125 is operatively connected to the cam 121 by means of a linkage 126. The switch array 81 is mounted for free rotation on the shaft 123. The ratchet wheel 91', which is an integral part of the array 81, is held against rotation in the clockwise direction, as viewed in Fig. 5, by means of a spring pressed dog 127. Thus, when the cam 122 is stepped in the clockwise direction as a result of the energization of the relay 114, the dog 90 slips past one tooth of the ratchet wheel 91'. When the relay 114 becomes deenergized, the cam 122 is moved back in the counterclockwise direction by the coil spring 128, which is connected to the frame 124 and to the cam 121. This return movement carries the array 81 one step in the counterclockwise direction, as viewed in Fig. 5. The ratchet wheel 91' and the other elements of the array 81 are mounted upon a sleeve 129 by means of rivets 130. A metal ring 131 is mounted on a disc 132 of insulating material. This ring carries six contacts 133 which are arranged to be engaged by contacts 134. The contacts 134 are carried by radial arms 135. These arms are located within slotted radial arms 136 which project beyond them. The arms 134 and 136 are connected by horseshoe Phosphor bronze springs 137. The six arms 135 and 136 are preferably stamped out of a piece of metal so that the six arms are in the form of a star which is assembled in the array and is grounded to the sleeve 129. A contact 138 which is mounted upon and electrically connected to the sleeve 129, engages a contact 139 on the frame 124 so that the contacts 134 are grounded. In normal condition, the arms 135 and 136 are in the position shown in Fig. 8 with the contacts 133 and 134 separated. When one of the solenoids 84, 86 or 88 is energized, its armature presses the arm 136 downwardly into its position in Fig. 7 and the horseshoe spring 137 snaps the arm upwardly so that the contact 134 is brought into engagement with the contact 133 as shown in Fig. 7. A brush 140 engages the ring 131 and the conductor 82 is connected to the brush 140. Consequently, when one of the switches is closed as is shown in Fig. 7, the machine is operative to make selections. The element 91 is a cam which is arranged to engage the arm 136 which is in position shown in Fig. 7 when the switch array 81 has been stepped around after delivery of the number of selections for which credit has been established. During the last step of the switch array 81, the cam 91 elevates the arm 136 from its position in Fig. 7 so that it snaps back into its elevated position shown in Fig. 8, thus removing the ground for the line 82.

Figure 4:
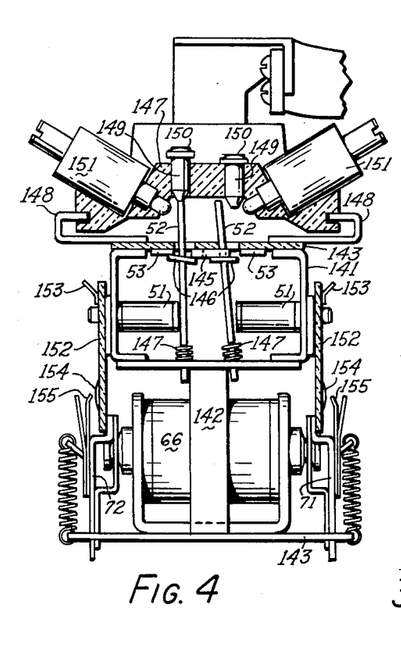
Fig. 4 is a transverse sectional view of the selector assembly which includes the group electromagnetic devices, the selector electromagnetic devices and associated parts.

The electromagnets 51 are mounted in two opposite rows on a frame 141, which is supported by posts 142 on a base-plate 143. It will be understood that electromagnets 51 corresponding to selections A1 and A2 are in opposition since they correspond to opposite sides of a single recording. Likewise, the electromagnets corresponding to A2 and A3 are in opposition and so forth. The upper member 143 of the frame 141 is a strip of insulation provided with openings 144 through which the upper ends of the armatures 52 project. On its underside the strip 143 carries the two metal bars 53. Between the two armatures is located a strip of metal 145 which is of slightly greater thickness than the bars 53. The armatures 52 are shouldered to provide supports for metal washers 146. The lower ends of the armatures 52 are reduced and received in openings in the bottom of the frame 141. Individual springs 147 on each armature engage the bottom of the frame 141 and also shoulder on the armatures 52 so that these armatures are biassed upwardly. When one of the armatures is in non-actuated position as shown on the right hand side of Fig. 4, its washer 146 rests solely against the strip 145. When an armature has been moved to actuated position by its electromagnet 51 as shown on the left hand side of Fig. 4, its washer bridges across one of the bars 53 and the strip 145 so that the bar 53 is grounded, putting the phonograph into operation.

A slide 147 moves with the movable unit of the phonograph along longitudinal guides 148. A slide 147 carries two contacts 149 which are arranged to engage any actuated armature 52 in the manner shown on the left hand side of Fig. 4. The contacts 149 are biased downwardly by spring contacts 150 which are connected to circuits in the phonograph unit to effect arrestment of this unit when a contact 149 engages a displaced armature 52. After playing of the selected recording has been determined on the machine, the appropriate solenoid 151 is energized and its armature returns the corresponding displaced armature 52 to its normal position.

The frame 141 carries two depending strips of insulation 152. One end of the winding of each electromagnet 51 is connected to a lug 153 on the strips 152 so that the conductors 1 to 20 may be connected to the appropriate electromagnets 51. The other ends of the windings are connected individually to two longitudinal series of contacts 154. Each double electromagnet 66 to 70 attracts its pair of armatures 71, 72 and 73, 74, etc. These armatures carry light contact fingers 155 which engage the contacts 154 on the strips 152 when their particular double electromagnet is energized. As has heretofore been explained when double electromagnet 66 is energized, the contacts 154 corresponding to the first 20 selections A1 to B10 are engaged by their fingers 155 carried by the armatures 71 and 72. All the armatures 71 to 80 are grounded. As has heretofore been explained, voltage is, at this time, supplied to only one of the conductors 1 to 20 and this conductor is connected to only one of the group of electromagnets 51 corresponding to the energized double electromagnet, 66 for example.

The operation is as follows: Credit is established by inserting a coin and closing one of the switches 83, 85 or 87, so as to effect the closing of one of the switches on the array 81. The solenoid 92 is energized, bringing the detents 100 of the latch bars 88 into operating position. The operator pushes one of the buttons and that button is held in by the corresponding detent 100. When he pushes another button of the other series, the selection is made. Pushing in one of the letters buttons closes the switches 94 and 113. Pushing a numbers buttons closes the switches 112 and 111. A circuit is now completed from ground, conductor 82, switch 94, switch 111, relay 114, normally closed switch 93 to power line 89. The solenoid of the relay 114 in initial movement closes the switch 115, providing a shunt circuit for the relay 114. When the switch 115 thus closes, the circuit 114 is completely energized irrespective of any manipulation of the buttons which the user may attempt. After the switch 115 closes, the switches 62 and 65 close and immediately thereafter, the cam 122 closes the switch 120 and energizes the relay 118. Sufficient interval between the closing of the switches 62 and 65 and the closing of the switch 120 is provided so as to make sure of the energization of the desired one of the electromagnets 51 before the relay 118 interrupts the connection between the power line 89 and the switches 62 and 65. When the switch 120 closes, the relay 118 becomes energized, opening switches 116 and 93 and closing switch 119. The opening of the switch 116 interrupts the circuit of the switches 62 and 65, deenergizing that electromagnet 66 to 70, determined by the selection made and deenergizing the electromagnet 51 which was selected. The opening of the switch 93 deenergizes the cancel relay 114 so that its armature resumes normal position and in attaining that position, the ratchet wheel 91' is moved one switch space towards switch opening position. If only one selection had been paid for, the controlling switch of the array 81 opens and deenergizes the machine. If, however, more than one play had been paid for, the line 82 remains grounded and the machine can be operated again to make the further selections paid for. The opening of the switch 93 also deenergizes the relay 92 even if credit remains on the credit array, allowing the buttons to move out. The closing of the switch 119 provides a circuit through the relay 118 through either or both of the switches 112 and 113. Thus, if the operator holds one or both of the buttons in, the relay 118 remains energized, holding the switch 93 open. The making of a selection requires the closing of the switches 62 and 65 which, in turn, requires energization of the cancel relay 114. The relay 114 cannot be energized until after the relay 118 is deenergized. The deenergization of the relay 118 requires release of both buttons and the consequent opening of both switches 112 and 113.

In the immediately previous description of the operation of the device, no reference is made to the manner in which a particular selection is made. If the two buttons had been A and 1, the switch 65 would be connected through contact 57 of the A button to magnet 66. The switch 62 would be connected through the series circuit of the contact 56 of the numbers buttons to line 63 to the series contact provided by the contacts 59 and through the displaced contact 59 of button 1 to conductor 1. As has been previously pointed out, conductor 1 is connected to one side of electromagnets A1, C1, E1, G1 and J1. Consequently, when the switches 62 and 65 are closed, voltage is applied to the five electromagnets just mentioned. Simultaneously, the energization of the magnet 66 grounds all the A and B electromagnets 51. Consequently, only A1 is energized. It is to be noted that while voltage is applied to one side of the electromagnets 51 corresponding to C1, E1, G1 and J1, these electromagnets are not energized since their other sides are completely unconnected, the electromagnet 67, 68, 69 and 70 not being energized.

If buttons B and 1 had been pressed, the switch 65 would be connected to the series circuit provided by the contacts 57 and through the displaced contact 57 of button B to the electromagnet 66. The switch 62 would be connected through the series circuit provided by the contacts 66 through the line 64 and the series circuit provided by the contacts 58 and through the displaced contact 58 of button 1 to line 11. Line 11 is connected to one side of the electromagnets B1, D1, F1, H1 and K1. When the switches 65 and 62 become closed, the electromagnet 66, alone of the series 66 to 70, is energized, again grounding all the A and B electromagnets 51. At the same time, voltage is applied to line 11 so that electromagnet B1 is energized. Here again, while voltage is applied to one side of electromagnets D1, F1, H1 and K1, the other sides of these electromagnets are completely disconnected.

Other combinations of a number and letter button will have single individual results of energizing the corresponding electromagnet 51. Thus, to take another example, suppose the buttons C and 7 are actuated. The switch 65 is connected through the series circuit provided by the contacts 57 and the displaced contact 57 of button C to the electromagnet 67. The switch 62 is connected through the series circuit provided by the contacts 58 and the displaced contact 58 of the button C to the line 63, through the series circuit provided by the contacts 59 and the displaced contact 59 of the button 7 to conductor 7. Conductor 7 is connected to electromagnets 51 corresponding to A7, C7, E7, G7 and J7. Again, the other sides of these electromagnets are completely unconnected with the exception of C7, so that the desired selection is attained. It is to be noted that the armatures 71 to 80 are energized only a pair at a time and when thus energized, they ground the selector electromagnetic devices A1 to B10, or C1 to D10, or E1 to F10, or G1 to H10, or J1 to K10. Likewise, only one of the common conductors 1 to 20 is supplied with voltage at any one time. This is true even if several buttons of one or both sets are actuated simultaneously. Thus, if letter buttons D and G are actuated, the contact 57 of the D button connects the switch 65 to the electromagnetic device 67 and breaks the circuit between the switch 65 and the contact 57 of the G button. Actuation of the G button connects the switch 62 to the line 63 and breaks the series circuit to the contact 56 of the D button. Thus, it is impossible to connect the switch 62 to both the series circuit provided by the contacts 58 and 59. These two series circuit are likewise broken by an actuated numbers button so that only one of the common conductors can be energized at any one time. Thus, if the series circuit provided by the contacts 59 is connected to the switch 62 by actuation of letters button A, C, E, etc., then actuation of numbers buttons 3 and 5 will have the effect of connecting common conductor 3 only. This series circuit having been broken by button 3, no voltage is applied to common conductor 5. The same consideration applies to the series circuit provided by the contact series 58.

Figure 9:
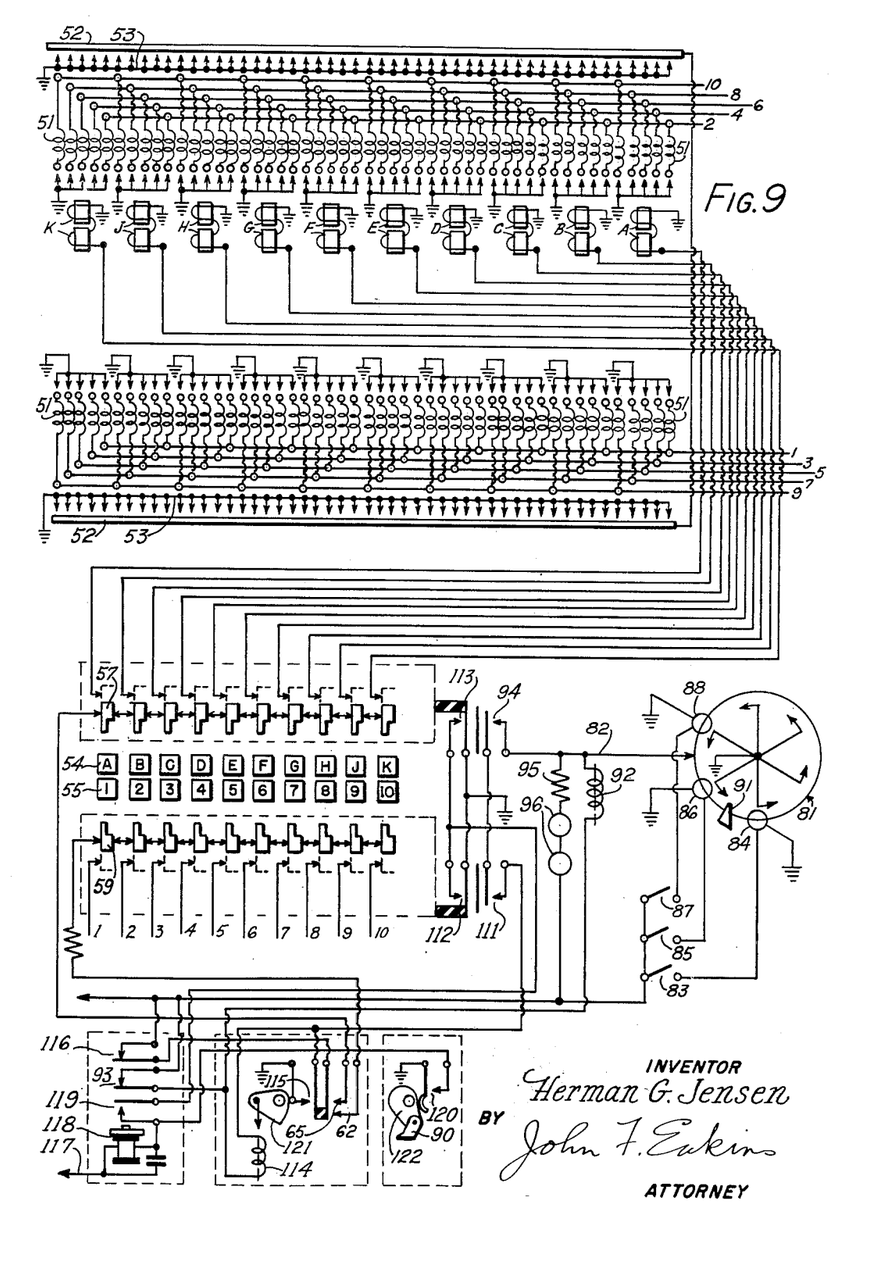
Fig. 9 is a fragmentary wiring diagram showing my invention applied to a selector employing 10 groups and 10 common conductors.

In Fig. 9 I have shown a fragmentary wiring diagram of a selector employing the same number of groups and the same number of common conductors as there are buttons in each set, that is, 10. The contacts 56 and 58 are omitted. Each contact 57, when actuated, connects the switch 65 to one of the group electromagnetic devices. Since, in this case, each letter button energizes an individual group electromagnetic device, these electromagnetic devices are designated A, B, C, etc. The switch 62 is connected to the series circuit provided by the contacts 59. Each numbers button, when actuated, connects the switch 62 directly to the one of 10 common conductors which bear the same number as the button. Common conductor 1 is connected to the selector electromagnetic devices A1, B1, C1, D1, etc. Common conductor 2 is connected to selector electromagnetic devices B2, C2, D2, etc., and so forth. It will readily be understood that when any letters button and any numbers button are actuated, the corresponding selector electromagnetic device alone will be energized. Thus, if button C is actuated, the group electromagnetic device C is connected to the switch 65. If a numbers button, for example 5 is actuated, the switch 62 is connected to common conductor 5. As has hereinbefore been described, upon the actuation of these two buttons, the switches 65 and 62 are closed and voltage is thus supplied to the group electromagnetic device C so that all the selector electromagnetic devices C1 to C10 are grounded. The common conductor 5 is connected to selector electromagnetic devices A5, B5, C5, D5, etc., but since only the electromagnetic device C5 is grounded, this is the only selector electromagnetic device which is energized.

Although the invention has been described in connection with the specific details of preferred embodiments thereof, it must be understood that such details are not intended to be limitative of the invention, except in so far as set forth in the accompanying claims.

Having thus described my invention, I declare that what I claim is:

1. A selector for automatic phonographs comprising a plurality of groups of electromagnetic selector elements, a plurality of common conductors each connected to a single electromagnetic element of each group, a common conductive member for the selector elements of each group actuable into electrical contact with the other sides of the elements of its group, two manually operable selector means, one selector means being arranged to connect either of a pair of said common conductors and an actuated conductive member in a common power circuit, the other selector means being arranged to determine the actuation of one of said conductive members, and switch means associated with said other selector means selectively to cause only one of said common conductors to be included in said circuit, whereby only the selector element connected to the last mentioned common conductor and the last mentioned conductive means is energized to make a selection.

2. A selector for automatic phonographs comprising a plurality of groups of electromagnetic selector elements, a plurality of common conductors each connected to a single electromagnetic element of each group, a common conductive member for the selector elements of each group actuable into electrical contact with the other sides of the elements of its group, two series of switch members, one set being arranged to connect either of a pair of said common conductors and an actuated conductive member in a power circuit, the other series being arranged to determine the actuation of one of said conductive members, and switch means associated with said other series selectively to cause only one of said common conductors to be included in said circuit, whereby only the selector element connected to the last mentioned common conductor and the last mentioned conductive member is energized to make a selection.

3. A selector for automatic phonographs comprising a plurality of groups of electromagnetic selector elements, a plurality of common conductors each connected to a single electromagnetic element of each group, a conductive member for the selector elements of each group, individual electromagnetic means arranged to actuate each conductive member into electrical connection with the other sides of the elements of its group, two series of buttons arranged to be actuated manually, switch means associated with the buttons of one series arranged selectively to connect a first circuit to any one of said individual electromagnetic means of one group, switch means associated with the buttons of the second series for selectively connecting a second circuit and a third circuit to each of a pair of said common conductors, a fourth circuit, switch means associated with the buttons of the first series for connecting said fourth circuit selectively to the second or third circuit, and means for supplying voltage to said first and fourth circuits whereby a selected one of said individual electromagnetic means and the electromagnetic selector element, associated therewith and connected to the common conductor connected to that one of the second or third circuits connected to the fourth circuit by the last mentioned switch means, are energized.

4. A selector for automatic phonographs comprising a plurality of groups of electromagnetic selector elements, a plurality of common conductors each connected to a single electromagnetic element of each group, a conductive member for the selector elements of each group, individual electromagnetic means arranged to actuate each conductive member into electrical connection with the other sides of the elements of its group, two series of buttons arranged to be actuated manually, switch means associated with the buttons of one series arranged selectively to connect a first circuit to any one of said individual electromagnetic means of one group, switch means associated with the buttons of the second series for selectively connecting a second circuit and a third circuit to each of a pair of said common conductors, a fourth circuit, switch means associated with the buttons of the first series for connecting said fourth circuit selectively to the second or third circuit, and means rendered operable by actuating a button of each series for supplying voltage to said first and fourth circuits whereby a selected one of said individual electromagnetic means and the electromagnetic selector element, associated therewith and connected to the common conductor connected to that one of the second or third circuits connected to the fourth circuit by the last mentioned switch means, are energized.

5. A selector for automatic phonographs comprising a plurality of groups of electromagnetic selector elements, a plurality of common conductors each connected to an element of each group, a conductive member individual to each group arranged for actuation into engagement with the other sides of the selector elements of its group, an individual electromagnetic means for each conductive member, a first series of buttons, a first circuit, switches movable with said buttons and normally connected in series and to said first circuit, each switch being actuable by actuation of its button to break the series connection and connect said first circuit to one of said individual electromagnetic means, a second circuit, a second set of switches each movable with said buttons and normally connected in series and to said second circuit, a third circuit, a fourth circuit, each of the second set of switches being actuable by actuation of its button to break the series connection and connect said circuit to one of said third or fourth circuits, a second series of buttons, a third set of switches each movable with a button of the second series and normally connected in series and to said third circuit, each of the third set of switches being actuated by actuation of its button to break the series connection and connect said third circuit to an individual one of said common conductors, a fourth set of switches each movable with a button of the second series and normally connected in series and to said fourth circuit, each of the fourth set of switches being actuated by actuation of its button to break the series connection and connect said fourth circuit to an individual one of said common conductors, and means for supplying voltage to the first and second circuits to effect energization of the selector element corresponding to the actuated buttons one of each set.

6. A selector for automatic phonographs comprising a plurality of groups of electromagnetic selector elements, a plurality of common conductors each connected to an element of each group, a conductive member individual to each group arranged for actuation into engagement with the other sides of the selector elements of its group, an individual electromagnetic means for each conductive member, a first series of buttons, a first circuit, switches movable with said buttons and normally connected in series and to said first circuit, each switch being actuable by actuation of its button to break the series connection and connect said first circuit to one of said individual electromagnetic means, a second circuit, a second set of switches each movable with said buttons and normally connected in series and to said second circuit, a third circuit, a fourth circuit, each of the second set of switches being actuable by actuation of its button to break the series connection and connect said circuit to one of said third or fourth circuits, a second series of buttons, a third set of switches each movable with a button of the second series and normally connected in series and to said third circuit, each of the third set of switches being actuated by actuation of its button to break the series connection and connect said third circuit to an individual one of said common conductors, a fourth set of switches each movable with a button of the second series and normally connected in series and to said fourth circuit, each of the fourth set of switches being actuated by actuation of its button to break the series connection and connect said fourth circuit to an individual one of said common conductors, and means arranged to be operated by actuation of a button of each series for supplying voltage to the first and second circuits to effect energization of the selector element corresponding to the actuated buttons one of each set.

7. A selector for automatic phonographs comprising two rows of switch buttons, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, and means controlled by said second relay to interrupt said voltage supply.

8. A selector for automatic phonographs comprising two rows of switch buttons, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, means controlled by said second relay to interrupt said voltage supply, and a holding circuit for said second relay including a switch closed by said second relay and switch means closed by any button in actuated condition.

9. A selector for automatic phonographs comprising two rows of switch buttons, latching means for holding any actuated button in actuated condition, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, and means controlled by said second relay to interrupt said voltage supply and move said latching means to unlatching condition.

10. A selector for automatic phonographs comprising two rows of switch buttons, latching means for holding any actuated button in actuated condition, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, means controlled by said second relay to interrupt said voltage supply and move said latching means to unlatching condition, and a holding circuit for said second relay including a switch closed by said second relay and switch means closed by any button in actuated condition.

11. A selector for automatic phonographs comprising two rows of switch buttons, latching means for holding any actuated button in actuated condition, electromagnetic means for maintaining said latching means in latching condition, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, and means controlled by said second relay to interrupt said voltage supply and deenergize the electromagnetic means associated with the latching means.

12. A selector for automatic phonographs comprising two rows of switch buttons, latching means for holding any actuated button in actuated condition, electromagnetic means for maintaining said latching means in latching condition, a plurality of electromagnetic selector elements, switch means operably associated with said buttons arranged to establish selector circuits for the energization of a single electromagnetic selector element when a button of each row is actuated, a first relay, switch means associated with said buttons arranged to energize said relay when a button of both rows is actuated, a second relay, means controlled by said first relay to supply actuating voltage to said established circuits and to energize said second relay, means controlled by said second relay to interrupt said voltage supply and deenergize the electromagnetic means associated with the latching means, and a holding circuit for said second relay including a switch closed by said second relay and switch means closed by any button in actuated condition.

HERMAN G. JENSEN.

REFERENCES CITED

The following references are of record in the file of this patent:

UNITED STATES PATENTS

| Number | Name | Date |
| --- | --- | --- |
| 1,331,151 | Hopkins | Feb. 17, 1920 |
| 2,319,946 | Osborne et al. | May 25, 1943 |
| 2,425,974 | Winkler | Aug. 19, 1947 |
| 2,446,643 | Farmer | Aug. 10, 1948 |
| 2,456,893 | Roth | Dec. 21, 1948 |
| 2,489,782 | Jensen | Nov. 29, 1949 |

FOREIGN PATENTS

| Number | Country | Date |
| --- | --- | --- |
| 287,274 | Germany | Apr. 24, 1914 |